US012710327B2

(12) United States Patent
Kreutzer et al.

(10) Patent No.: US 12,710,327 B2
(45) Date of Patent: Aug. 18, 2026

(54) CAPACITIVE PRESSURE SENSOR FOR DETECTING A PRESSURE, COMPRISING TWO PRESSURE RANGES, AND PRODUCTION METHODS

(71) Applicant: Robert Bosch GmbH, Stuttgart (DE)

(72) Inventors: Joachim Kreutzer, Stuttgart (DE); Arne Dannenberg, Metzingen (DE); David Slogsnat, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 411 days.

(21) Appl. No.: 18/579,678

(22) PCT Filed: Jun. 2, 2022

(86) PCT No.: PCT/EP2022/065101
§ 371 (c)(1),
(2) Date: Mar. 22, 2024

(87) PCT Pub. No.: WO2023/001440
PCT Pub. Date: Jan. 26, 2023

(65) Prior Publication Data

US 2024/0344910 A1 Oct. 17, 2024

(30) Foreign Application Priority Data

Jul. 20, 2021 (DE) ..................... 10 2021 207 745.5

(51) Int. Cl.
*G01L 19/06* (2006.01)
*G01L 9/00* (2006.01)

(52) U.S. Cl.
CPC .......... *G01L 9/0042* (2013.01); *G01L 9/0073* (2013.01); *G01L 19/0618* (2013.01)

(58) Field of Classification Search
CPC .... G01L 9/0042; G01L 9/0073; G01L 9/0618
See application file for complete search history.

(56) References Cited

U.S. PATENT DOCUMENTS

2007/0209443 A1 9/2007 Yoshikawa et al.
2013/0234263 A1* 9/2013 Ikehashi .............. G01L 9/0044 257/415
2018/0017456 A1* 1/2018 Kautzsch .............. G01L 9/0048
2019/0383684 A1* 12/2019 Kollias .................... G01L 9/02
2024/0288324 A1* 8/2024 Kreutzer .............. G01L 9/0041

FOREIGN PATENT DOCUMENTS

DE 112013004125 T5 5/2015
WO 2013003789 A1 1/2013

OTHER PUBLICATIONS

International Search Report issued in PCT/EP2022/065101 on Sep. 19, 2022.

* cited by examiner

*Primary Examiner* — Dale E Page
*Assistant Examiner* — Wilner Jean Baptiste
(74) *Attorney, Agent, or Firm* — Norton Rose Fulbright US LLP

(57) ABSTRACT

A capacitive pressure sensor element. The capacitive pressure sensor element includes a first measuring capacitor, which generates a first sensor signal in a first pressure range, and a second measuring capacitor, which is used as a reference capacitor in the first pressure range and which generates a second pressure-based sensor signal in the second pressure range. A pressure sensor system which has at least two of the pressure sensor elements, and methods for producing the pressure sensor the pressure sensor system are also described.

17 Claims, 5 Drawing Sheets

100
160
220
105
160
230
230
210
200
190
170
130
120
180
140
210
150
110

100
220
180
200
170
130
120
160
140
150
110

CAPACITIVE PRESSURE SENSOR FOR DETECTING A PRESSURE, COMPRISING TWO PRESSURE RANGES, AND PRODUCTION METHODS

FIELD

The present invention relates to a pressure sensor element for detecting pressures, comprising two pressure ranges and a method for its production.

BACKGROUND INFORMATION

Conventional sensors, in particular micromechanical sensors, are designed for a predetermined pressure sensor range. High sensitivities are normally provided in this pressure sensor range intended for the particular application, so that even the smallest pressure fluctuations can be detected. For example, floor recognition for indoor navigation by means of ambient pressure detection requires that even the smallest changes in pressure can be detected and interpreted. However, in the case of some pressure sensor applications, temporary high pressure peaks in particular can occur, which are also relevant for the corresponding application. For example, in-ear headphones can be equipped with pressure sensors that, once inserted into the ear, have no way of equalizing pressure for a short time, which means that pressures above the typical ambient pressure can occur for a short time. The use of pressure sensors in dive computers must also cover significantly higher pressure ranges during dives.

SUMMARY

The present invention provides a capacitive pressure sensor that generates a pressure-based sensor signal in each of two different pressure ranges, along with a production method for such a pressure sensor.

The present invention provides a capacitive pressure sensor element with a first measuring capacitor, which generates a first (measuring) sensor signal in a first pressure range, and a second measuring capacitor, which is used as a reference capacitor in the first pressure range and which generates a second pressure-based (measuring) sensor signal in a second pressure range. In addition, the present invention provides a pressure sensor system which has at least two of the pressure sensor elements according to the present invention, along with a method for producing the pressure sensor element as well as the pressure sensor system. Furthermore, a method for operating the pressure sensor system according to the present invention or for generating a pressure sensor signal by means of such a pressure sensor system or the underlying pressure sensor element are also described.

In the pressure sensor element according to an example embodiment of the present invention, a membrane is provided which is connected to a first measuring capacitor. This first measuring capacitor has a first electrode, which is rigidly connected in particular to a carrier substrate, a carrier, a substrate, a base material or a frame or structure of the pressure sensor element. The second movable electrode of the first measuring capacitor is connected directly or indirectly to the membrane at a distance from the first electrode, for example in the lower region of a boss membrane, so that a deflection of the membrane in accordance with a pressure within a first pressure range leads to a change in distance between the two electrodes. The deflection of the membrane and thus the capacitance between the first and second electrodes, which varies due to the change in distance, can subsequently be detected as a measure of the pressure applied to the membrane. However, if the pressure on the membrane is so great that the second electrode rests on the first electrode or the movement of the second electrode is restricted by spacers, the capacitance measurement can no longer be used for pressure detection without further findings. For this purpose, a second measuring capacitor is provided in the pressure sensor element according to an example embodiment of the present invention, which is used as a reference capacitor in the first pressure range, which is characterized by the fact that the applied pressure and the movement of the membrane do not result in a change in the capacitance of the second measuring capacitor. For this purpose, a third electrode is provided at the second measuring capacitor, which is rigidly attached in particular to a carrier substrate, a carrier, a substrate, a base material and/or within the frame or structure of the pressure sensor element. The fourth movable electrode of the second measuring capacitor is attached at a distance therefrom, in particular to the side of the first measuring capacitor or of the first electrode. To detect a pressure in a second pressure range, in particular above the first pressure range, the membrane acts on the movable fourth electrode in such a way that it reduces its distance from the third electrode, so that a pressure-based second sensor signal can be derived from the change in the capacitance of the second measuring capacitor. The first (measuring) sensor signal of the first measuring capacitor can be short-circuited and only make an insignificant contribution to pressure sensor detection.

An advantage of the present invention is that the same pressure sensor element provides pressure-based sensor signals during two different pressure sensor ranges due to the disclosed structure. By using the second measuring capacitor as a reference capacitor in a first, in particular lower pressure sensor range, the quality or accuracy of the first (measuring) sensor signal can be increased. In the second pressure sensor range, on the other hand, the first (measuring) sensor signal generated by the first measuring capacitor can be used as a reference signal if the distance between the first and second electrodes no longer changes in the second pressure range due to the design. Alternatively, the first measuring capacitor can also be short-circuited in the second pressure range. In general, however, the second pressure range is selected to be higher than the first pressure range. The first pressure range represents the normal operating range of the pressure sensor element. Here, emphasis is placed on high accuracy, for example by being able to resolve movements of the membrane caused by small pressure differences very precisely by detecting the first measuring capacitor. In contrast, the second measuring capacitor covers a larger second pressure range, different from the first pressure range, with which movements of the membrane caused by pressure differences are detected by the second measuring capacitor with a lower resolution.

According to an example embodiment of the present invention, optionally, the pressure sensor ranges can also overlap to allow continuous pressure sensor detection. Here, if the second (measuring) sensor signal of the second measuring capacitor is present, the evaluation of the first (measuring) sensor signal can be dispensed with or its contribution can be suppressed.

The first electrode of the first measuring capacitor and the third electrode can be rigidly connected to one or more carrier substrates provided in a frame, structure or housing of the pressure sensor element. However, it is also possible for one of these two electrodes to be designed to be movable or flexible, for example to detect the movement of a further membrane or a further application of pressure. By means of such a design having, for example, a pressure feed from the rear of the pressure sensor element, the frame, the structure or the housing, a differential pressure measurement or the detection of the pressure of two volumes can be detected.

According to an example embodiment of the present invention, the membrane in the first pressure range has no (direct) mechanical connection to the second measuring capacitor and in particular not to the fourth electrode. Optionally, it can also be provided that although there is a mechanical connection between the membrane and the fourth electrode of the second measuring capacitor in the first pressure range, no significant change in the capacitance of the second measuring capacitor is present or can be detected upon a deflection of the membrane.

In one design of the present invention, the second electrode of the first measuring capacitor is in the center of the membrane, for example at the end of an extension to the first electrode on the carrier, a substrate, a base material and/or the frame base. Here, the central region of the membrane can be designed as a boss membrane, on the lower end of which the second electrode is formed. A plunger or an extension, which is directed toward the fourth electrode of the second measuring capacitor, can be provided to the side of the first measuring capacitor. The plunger can be designed as an integral part of the membrane. Alternatively, the plunger can also be attached to the fourth electrode, so that in the case of a corresponding deflection upon application of a pressure in the second pressure range, the membrane presses on the plunger and thus moves the fourth electrode in the direction of the third electrode, so that their distance is reduced. This change in distance can then be further processed as a change in capacitance in the form of the second (measuring) sensor signal.

In a further design of the present invention, the first and second measuring capacitors are connected in series. This results in a sensor signal for the series-connected measuring capacitors, which shows a different (pressure-based) behavior in the first and second pressure range. This behavior is determined by a generation principle of the electrodes of the two measuring capacitors acting in the particular pressure range.

According to an example embodiment of the present invention, optionally, two second measuring capacitors can be provided to the side of the central first measuring capacitor. Here, both second measuring capacitors can be used to detect the pressure-based second (measuring) sensor signal. Alternatively, only one of the second measuring capacitors can be pressure-sensitive for the second pressure range, while the further second measuring capacitor continues to act as a reference capacitor.

Furthermore, according to an example embodiment of the present invention, a pressure sensor system is provided, which has two of the capacitive pressure sensor elements described above. For the evaluation of the (measuring) sensor signals in accordance with the pressure applied to the membrane, it can be provided in one design that the two capacitive pressure sensors are connected in the form of a Wheatstone bridge circuit. A first and a second measuring capacitor each represent an arm of the bridge circuit. When using two second measuring capacitors in a pressure sensor element, these can be connected in series.

In addition, a particular method is provided according to an example embodiment of the present invention for producing the pressure sensor element described above as well as the pressure sensor system. The characteristic features of the pressure sensor element described, in particular the membrane and the electrodes along with the plunger, can be produced using conventional micromechanical methods.

According to an example embodiment of the present invention, a method is provided for operating the pressure sensor system or for generating a pressure sensor signal by means of the pressure sensor system or at least one of the underlying pressure sensor elements, which method has different operating modes. The operating modes depend on the pressure applied to the at least one pressure sensor element of the pressure sensor system. For example, a first operating mode can be provided in a first pressure range and a second operating mode in a second pressure range, wherein the pressure ranges can be predetermined in accordance with the design of the pressure sensor element described above. In general, the method initially detects at least one first sensor signal of a first measuring capacitor and at least one second sensor signal of a second measuring capacitor. In accordance with the at least one first sensor signal, the first or second operating mode is subsequently selected. The difference between the two operating modes lies in the fact that the at least one first sensor signal is substantially used to generate the pressure sensor signal in the first operating mode, while the at least one second sensor signal is substantially used in the second operating mode.

Optionally, according to an example embodiment of the present invention, it can also be provided that two pressure sensor elements are used so that a first sensor signal is detected for each first measuring capacitor and a second sensor signal is detected for each second measuring capacitor.

A first pressure range can be assigned to the first operating mode, while a second, higher pressure range is assigned to the second operating mode. The second pressure range can be adjacent to the first pressure range or partially overlap with the first pressure range. The pressure ranges can be predetermined by the structure of the pressure sensor element, in particular by the design of the membrane and the plunger arranged thereon.

The transition from the first to the second operating mode or from the first to the second pressure range can be recognized in accordance with the at least first sensor signal. Thus, if a short circuit is recognized in the first measuring capacitor or if the rate of change of the first sensor signal is below a threshold value, it can be recognized that there is no change in the first measuring capacitor despite a change in pressure. This can also be indicated, for example, by a change in the second sensor signal due to the second measuring capacitor, which is used as a reference capacitor in the first pressure range and therefore does not undergo any change.

Furthermore, it can be provided that switching between the individual operating modes of the pressure sensor takes place at predeterminable time intervals, and that the first pressure sensor signal or second pressure sensor signal then detected is evaluated with regard to monitoring the function of the pressure sensor and/or checking the plausibility of the pressure measurements.

Further advantages can be seen from the following description of exemplary embodiments of the present invention, and the rest of the disclosure herein.

DETAILED DESCRIPTION OF EXAMPLE EMBODIMENTS

Figures 1, 2:
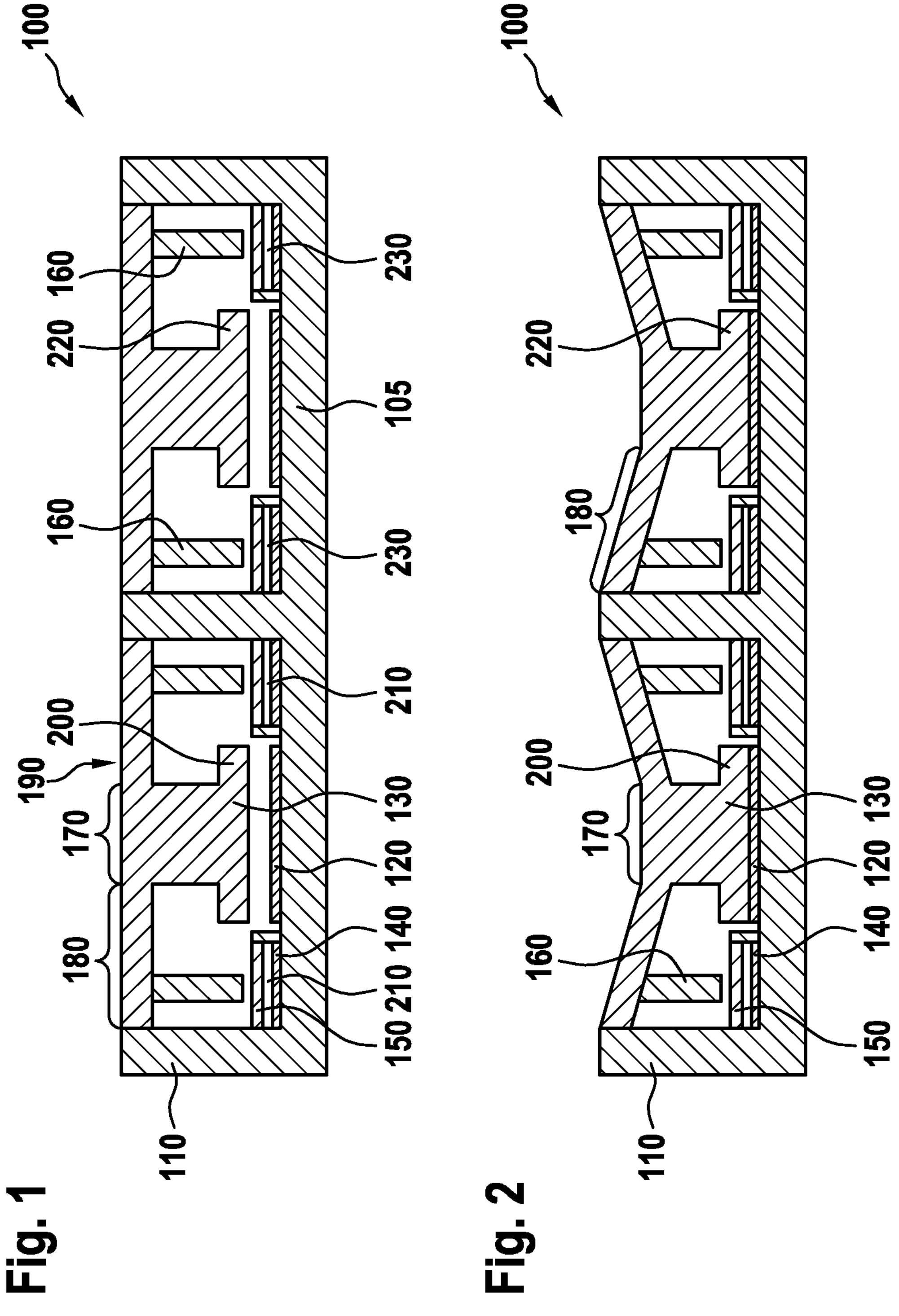
FIG. 1 schematically shows a capacitive pressure sensor element according to an example embodiment of the present invention with two measuring capacitors.
FIGS. 2 and 3 show the mode of operation of the capacitive pressure sensor according to an example embodiment of the present invention.

The present invention can be described based on the structure of a pressure sensor element as shown in FIG. 1. FIG. 1 shows the use of two pressure sensor elements according to the present invention in a common carrier substrate, carrier, substrate, base material or a frame or structure 110 or separately in a housing of a pressure sensor system 100 or a pressure sensor. Optionally, however, a single pressure sensor element can also be used for carrying out the detection of the pressures in two pressure ranges.

A pressure sensor element according to the present invention consists of at least one membrane 190 that is subjected to the pressure to be measured, a first measuring capacitor 200 and a second measuring capacitor 210. The first measuring capacitor 200 has a first electrode 120 that is applied to a carrier 105, a substrate, a base material and/or to the base of the frame 110 into which the pressure sensor element is inserted. The second electrode 130 of the first measuring capacitor 200 is at least partially connected above the first electrode 120 directly or indirectly to the membrane 190, so that a movement of the membrane 190, for example a deflection due to an externally applied pressure on the membrane 190, changes the distance between the first and second electrodes. This change in distance causes a change in the capacitance of the first measuring capacitor 200, from which a pressure-based first (measuring) sensor signal can be derived. If the pressure on the membrane 190 is high enough for the second electrode 130 to be pressed onto the first electrode 120, there is no significant further change in capacitance if the pressure is increased further, so that pressure detection is no longer possible above a design pressure limit value. In order to still allow pressure detection, according to the present invention, a reference capacitor used for the first pressure range is used with a third electrode 140 and a fourth electrode 150 as the second measuring capacitor 210. For this purpose, the third electrode 140 is rigidly connected to a carrier, a substrate, a base material and/or the base of the frame 110, so that it is rigid with respect to movement. The carrier, the substrate or the base material can be the same carrier, the same substrate or the base material to which the first electrode 120 is also applied.

The fourth electrode 150 is attached at a distance from the third electrode 140.

Figure 4:
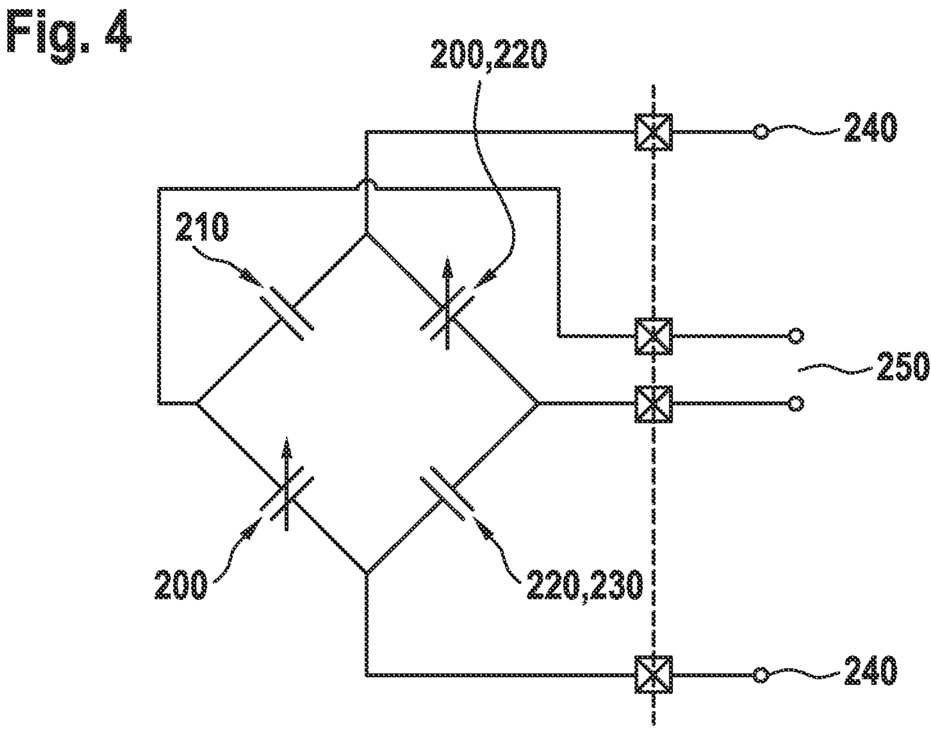
FIG. 4 shows an equivalent circuit diagram for the capacitive pressure sensor element according to an example embodiment of the present invention.

By connecting the measuring capacitor 200 and 210 accordingly, a resulting sensor voltage at the contacts 250 between the two measuring capacitors and the two reference capacitors can be detected, for example by means of a Wheatstone bridge circuit according to FIG. 4, and evaluated according to a compensation algorithm. The connection can, for example, take the form of a series connection of the first measuring capacitor 200 with the second measuring capacitor 210, which is used as a reference capacitor in the first pressure range.

In the exemplary embodiment of FIG. 1, a plunger 160 or generally a pressure transmission element is provided on the membrane 190, which is directed toward the fourth electrode 150, but does not touch it. The mode of operation of this plunger 160 or the pressure transmission element is described based on FIGS. 2 and 3.

If a pressure in a first pressure range is applied to the membrane 190, the membrane 190 bends inwardly, so that the distance between the first and second electrodes 120 and 130 is reduced. The capacitance of the first measuring capacitor 200, from which a first pressure-based (measuring) sensor signal can be derived, changes when this distance is reduced. If the second electrode of the first measuring capacitor 200 is fastened in a central region 170 in the middle of the membrane 190, the membrane 190 bends evenly on both sides of the central region. Upon reaching a critical pressure, the second electrode 130 rests on the first electrode 120 so that, despite an increase in pressure, there can be no further change in the distance of the first measuring capacitor 200 and thus no further significant pressure-based generation of the first (measuring) sensor signal (see FIG. 2). This critical pressure at the membrane 190 defines the end of the first pressure range. Optionally, it can be provided that the electrodes 120 and/or 130 have an insulating layer or that spacers are assigned to the first measuring capacitor 200, so that no mechanical or electrical contact actually occurs between the electrodes.

Above the critical pressure, a further increase in pressure causes the movable region 180 of the membrane 190 located to the side of the central suspension region 170 to deflect. The plunger 160 attached to the side of the first measuring capacitor 200 on the lower side of the membrane 190 is designed in such a way that it begins to bend or move the fourth electrode 150 of the second measuring capacitor 210 at the latest above the critical pressure (see FIG. 3). This movement of the fourth electrode 150 causes a change in distance to the third electrode 140, so that the generation of a pressure-based second (measuring) sensor signal can be derived from the resulting change in the capacitance of the second measuring capacitor 210. Since the deflectable region 180 of the membrane 190 is shortened in this second pressure range compared to the entire membrane 190, the second (measuring) sensor signal has a different pressure dependence compared to the first (measuring) sensor signal. In order to avoid an abrupt transition of the generation of the output pressure sensor signal from the first to the second pressure range, it can be provided that the plunger 160 acts on the fourth electrode 150 even before the critical pressure or the contact of the second electrode 130 with the first electrode 120 and changes the distance of the second measuring capacitor 210. By looking at the first and second (measuring) sensor signals together, the transition can be recognized and the detected pressure on the membrane can be clearly derived.

Optionally, by evaluating the (measuring) sensor signal, which is based on a model-like, generally valid and/or sensor-specific assignment rule, possibly with the aid of additional signals such as a contact recognition of the first and second electrodes 120 and 130, the (measuring) sensor signal can be assigned to the first or second pressure range and the ambient pressure acting on the membrane can be clearly derived on this basis.

In principle, the contact of the measuring electrodes and/or the plungers 160 or the high-pressure contact rods can be precisely determined with additional mechanisms, for example by closing an electrical contact, in order to be able to precisely determine the transition time and thus support the evaluation circuit or evaluation software. Alternatively, the transition between the ranges can also be implemented by describing the contact state. For example, the trimming process can be used to determine the relationship between ambient pressure, temperature and humidity at which the behavior changes from the first range to the second range.

The evaluation unit, which receives and interprets the first and second (measuring) sensor signals, must be designed to distinguish between different ranges and to be able to apply different logics in order to implement the appropriate calculations in each case. The precise implementation of the logic results from the actual implementation.

In a further design, the particularly non-conductive plungers 160 or pressure transmission element or high-pressure contact rods can also be designed in such a way that they mechanically contact the fourth electrode 150 of the second measuring capacitor 210 from the beginning in order to define a defined transition range.

In an alternative design, it can be provided that the plunger or the pressure transmission element is arranged directly on the fourth electrode 150 without there being mechanical contact with the membrane 190 in the first pressure range. With this exemplary embodiment, this mechanical contact with the generation of the connection of the fourth electrode 150 only comes into effect if the critical pressure is exceeded by the bent membrane pressing on the plunger or the pressure transmission element in the region 180.

In a further exemplary embodiment, it can be provided that the plunger 160 is not centrally attached in the region 180 of the membrane 190. Thus, the stiffness and thus the pressure dependence of the second (measuring) sensor signal can be adjusted by an asymmetrical arrangement of the plunger 160 in the region 180 (membrane region 300 is smaller or larger than the membrane region 310).

In a further exemplary embodiment, the plunger 160 is already seated on the fourth electrode 150 and deflects it before the second electrode 130 mechanically rests on the first electrode 120. In this case, both the first and the second measuring capacitor can contribute to the pressure-based (output) sensor signal if the pressure is increased further.

As explained at the beginning, the pressure sensor 100 can consist of two separate, substantially identical pressure sensor elements. Here, the second pressure sensor element can have a first measuring capacitor 220 and a second measuring capacitor 230 used as a reference capacitor in the first pressure range. Accordingly, the first measuring capacitor 220 is directly or indirectly connected to its own membrane. Furthermore, the membrane here also has a plunger 160 that acts on the second measuring capacitor 230 if the membrane is subjected to a pressure above the first pressure range.

Figure 3:
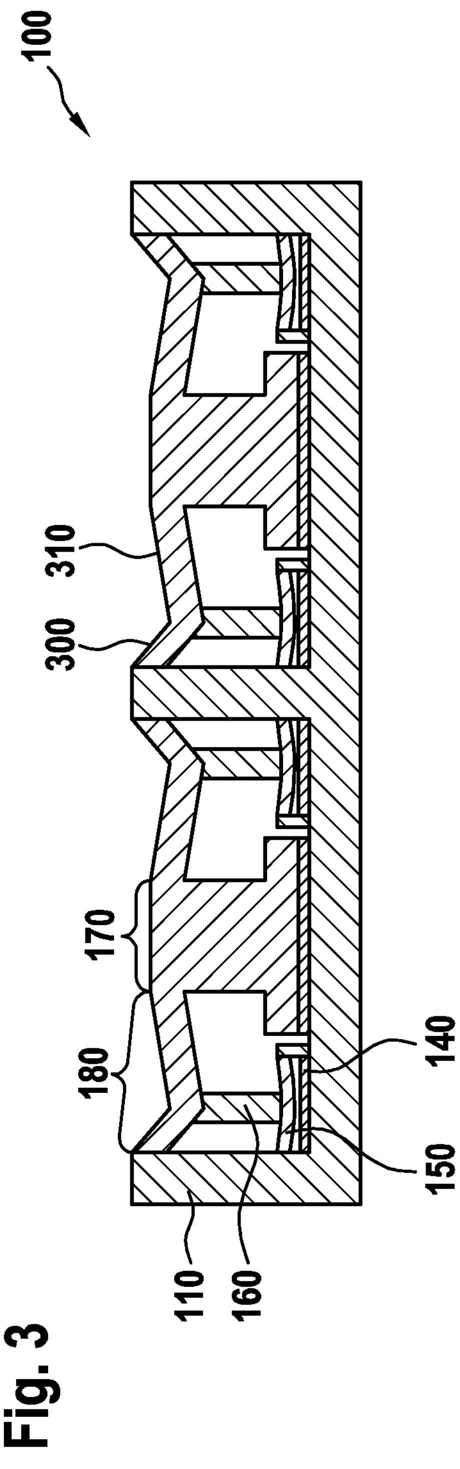

The pressure sensor element described based on FIGS. 1 to 3 or its components are usually produced using micromechanical method steps, in particular using epitaxy methods, etching steps, sacrificial layer techniques and semiconductor structuring. These methods can be used to produce the membrane 190, the plunger 160, the electrodes 120, 130, 140, 150 and at least part of the frame 110.

FIG. 4 schematically shows a wiring of the capacitances of two pressure sensor elements of the type described within the framework of a pressure sensor system for deriving the pressure sensor signal. Here, the first and second measuring capacitors 200 and 210 along with 220 and 230 of a pressure sensor element in each case form an arm of a Wheatstone bridge circuit, which are operated with a supply voltage 240. The pressure sensor signal is detected by means of a center tap 250 of the bridge circuit.

When using a plurality of reference capacitors as a second measuring capacitor 210, these can be connected in series. Upon reaching the minimum distance between the electrodes of the first measuring capacitor 200, its contribution can be short-circuited so that only the second measuring capacitors 210 are used to detect the sensor signal.

Figure 5:
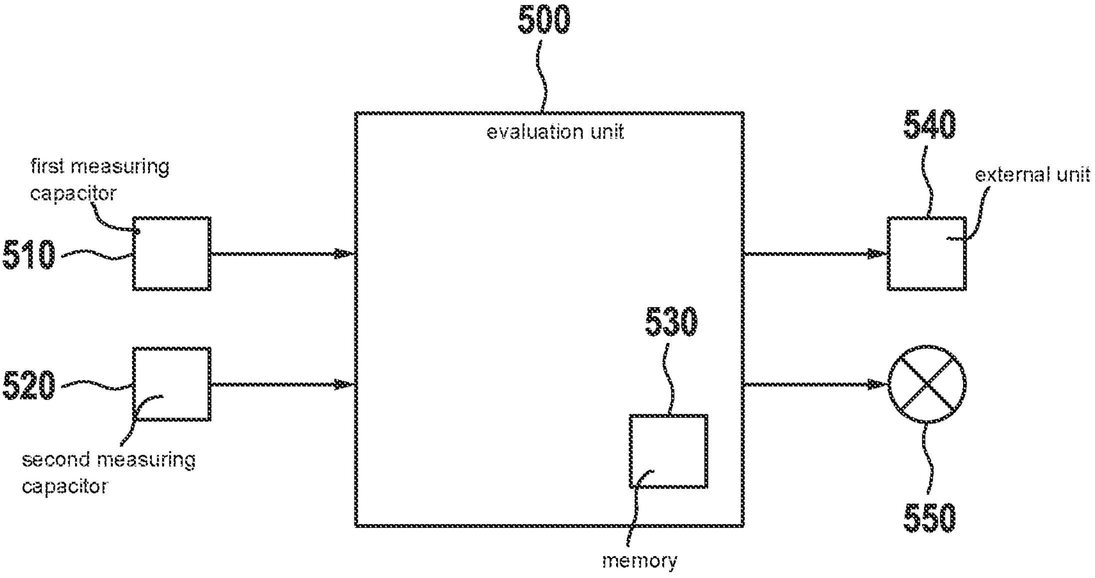
FIG. 5 illustrates the detection and evaluation of the pressure sensor according to an example embodiment of the present invention.

To evaluate and derive the (output) pressure sensor signal, an evaluation unit 500 is used as shown in the block diagram of FIG. 5, in which the detected capacitances of the first and second measuring capacitors 510 and 520 are input. A (output) pressure sensor signal can thus be derived by means of a conversion based, for example, on data stored in an assigned memory 530 and output to an external unit 540. Additionally or alternatively, the pressure sensor signal can also be displayed directly via a corresponding display 550. The transition point at which the second (measuring) sensor signal is used instead of the first (measuring) sensor signal for the derivation and output of the pressure sensor signal can be ascertained by taking into account the capacitance curve of both measuring capacitors along with the pressure curve derived therefrom. The different pressure dependence of the membrane can also be taken into account here. Optionally, further information, such as the temperature or humidity, can also be used.

Figure 6A:
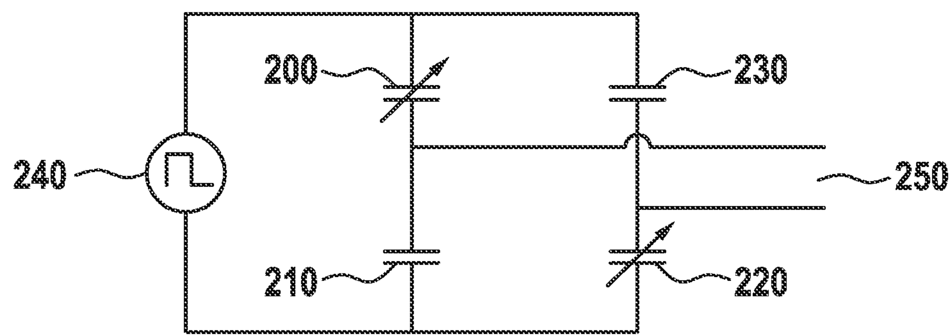
FIGS. 6A to 6E show various equivalent circuit diagrams, which illustrate the operating method of the pressure sensor according to an example embodiment of the present invention.
Figure 6B:
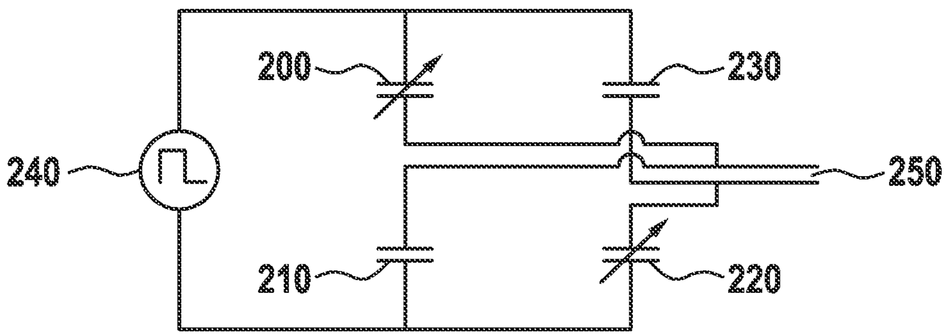
Figure 6C:
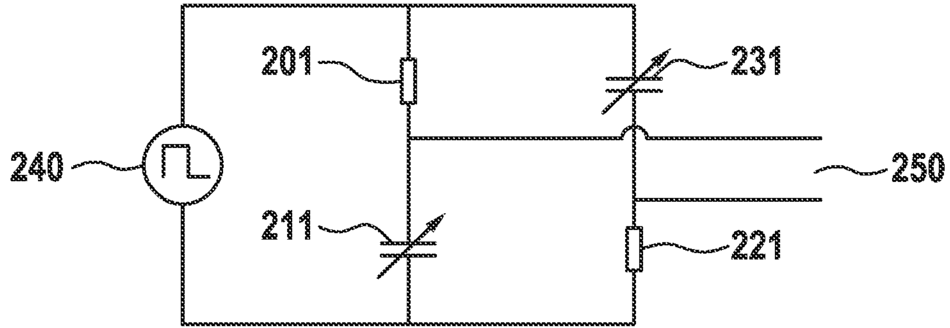

The equivalent circuit diagrams in FIGS. 6A to 6E can be used to illustrate the operating method of the pressure sensor according to the present invention. Here, the pressure sensor element is operated in two operating modes, which are divided into the first and second pressure ranges. FIG. 6A shows a Wheatstone bridge circuit, which represents the wiring of the pressure sensor system 100 or the pressure sensor in the first pressure range. As in accordance with FIG. 4, the supply is provided via an applied supply voltage 240, while the resulting pressure signal is detected by means of a center tap 250 of the bridge circuit. In FIG. 6A, the two second measuring capacitors 210 and 230 of both pressure sensor elements are used as reference capacitors in the first pressure range, while the first measuring capacitors 200 and 220 actively generate a measure of the applied pressure in this first pressure range by changing their capacitances. Alternatively, each individual pressure sensor element can also be tapped individually in the first pressure range, as shown in FIG. 6B. Here, a common tap 250 or two separate taps can be effected with subsequent joint evaluation. The latter would have the advantage that the two pressure sensor signals can be compared with one another in order to recognize deviations and possibly a fault in the pressure sensor element.

If the pressure sensor reaches the second pressure range, i.e., if there is mechanical contact between the first and second measuring electrodes 120 and 130 of the first measuring capacitors 200 and 220, a short circuit occurs between these measuring electrodes. Since this short circuit is caused mechanically, it can be assumed that the full supply current 240 is not present at the center tap 250. Instead, a residual resistance remains, for example due to high-resistance structures or coatings on the electrodes, which prevents a complete short circuit. In this case, the first measuring capacitors 200 and 220 previously used to detect the pressure sensor signal would become constant (residual) resistors 201 and 221 respectively in the equivalent circuit diagram in FIG. 6C. However, the previous non-variable reference capacitors 210 and 230 generate a change in the distances between the third and fourth electrodes 140 and 150 in the second pressure range, so that a pressure sensor signal can be detected in the second pressure range via these variable second measuring capacitors 211 and 231. The corresponding pressure sensor signal can then also be tapped via a common center tap 250.

Figure 6D:
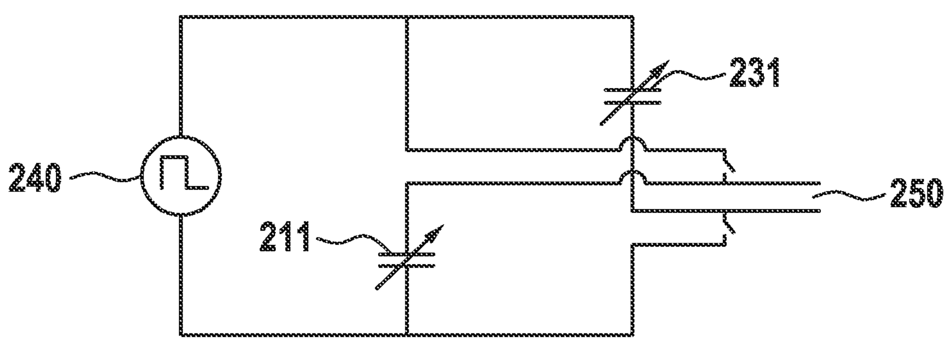
Figure 6E:
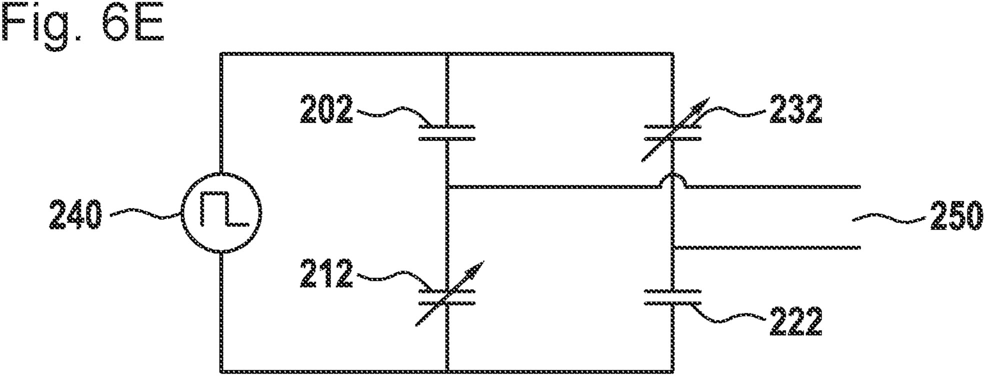

Optionally, the second measuring capacitors 211 and 231 can also be tapped separately or individually, as shown in FIG. 6D. The individual taps can be short-circuited or deactivated in the first pressure range, while they are activated in accordance with the recognized second pressure range, for example based on the signal value or by other measures.

In a further embodiment, the first measuring capacitors can also be ignored in the second pressure range, regardless of whether a short circuit is present or recognized, while only the second measuring capacitors 210 and 230 are taken into account for the pressure sensor signal. This can be the case, for example, if the electrodes of the first measuring capacitors 200 and 220 have a coating or spacer elements, so that no short circuit can occur. Since in this case the first measuring capacitors 200 and 220 do not generate any further change in the capacitances, these capacitors can remain as 202 and 222 in the bridge circuit according to FIG. 6E, while the original reference capacitors 210 and 230 provide the pressure sensor signal in the second pressure sensor range as second measuring capacitors 212 and 232.

In a further embodiment, it can be provided that switching between the individual operating modes of the pressure sensor takes place at predeterminable time intervals, and that the first pressure sensor signal or second pressure sensor signal then detected is evaluated with regard to monitoring the function of the pressure sensor and/or checking the plausibility of the pressure measurements.

The invention claimed is:

1. A capacitive pressure sensor element, comprising:
- a pressure-sensitive membrane;
- a first measuring capacitor connected to the membrane and configured to generate a first sensor signal, wherein the first measuring capacitor has a first electrode and a second electrode; and
- a second measuring capacitor configured to generate a second sensor signal, wherein the second measuring capacitor has a third electrode and a fourth electrode,
- wherein:
  - the first measuring capacitor is configured to generate the first sensor signal in accordance with a pressure of a first pressure range applied to the membrane, and wherein the second measuring capacitor is operated as a reference capacitor in the first pressure range, and
  - the second measuring capactitor is configured to generated the second sensor signal in accordance with a pressure of a second pressure range applied to the membrane.

2. The capacitive pressure sensor element according to claim 1, wherein the second pressure range has higher pressures than the first pressure range.

3. The capacitive pressure sensor element according to claim 1, wherein the first sensor signal of the first measuring capacitor has no pressure dependence in the second pressure range, wherein the first measuring capacitor is short-circuited in the second pressure range.

4. The capacitive pressure sensor element according to claim 1, wherein the second capacitor includes at least two second measuring capacitors, which are arranged to a side of the first measuring capacitor.

5. The capacitive pressure sensor element according to claim 1, wherein the first electrode of the first measuring capacitor and the third electrode of the second measuring capacitor are rigidly attached to a carrier or in a frame.

6. The capacitive pressure sensor element according to claim 1, wherein the fourth electrode of the second measuring capacitor is movably attached above the third electrode.

7. The capacitive pressure sensor element according to claim 1, wherein the second measuring capacitor has no mechanical connection to the membrane in the first pressure range.

8. The capacitive pressure sensor element according to claim 1, wherein the membrane has, to a side of the first measuring capacitor, at least one plunger that acts on the second measuring capacitor in the second pressure range upon application of pressure to the membrane, and wherein the plunger presses on the fourth electrode in the second pressure range in such a way that a distance between the third and fourth electrodes is reduced.

9. A pressure sensor system, comprising:
- at least one capacitive pressure sensor element, each including:
  - a pressure-sensitive membrane;
  - a first measuring capacitor connected to the membrane and configured to generate a first sensor signal, wherein the first measuring capacitor has a first electrode and a second electrode; and
  - a second measuring capacitor configured to generate a second sensor signal, wherein the second measuring capacitor has a third electrode and a fourth electrode,
- wherein:
  - the first measuring capacitor is configured to generate the first sensor signal in accordance with a pressure of a first pressure range applied to the membrane, and wherein the second measuring capacitor is operated as a reference capacitor in the first pressure range, and
  - the second measuring capactitor is configured to generated the second sensor signal in accordance with a pressure of a second pressure range applied to the membrane.

10. The pressure sensor system according to claim 9, wherein the at least one capactive pressure sensor element includes at least two capacitive pressure sensor elements,
- wherein the first and second measuring capacitors of the two capacitive pressure sensor elements are connected in the form of a Wheatstone bridge circuit, wherein in each case a first and a second measuring capacitor alternate in wiring.

11. The pressure sensor system according to claim 10, wherein:
- at a pressure applied to the membranes in the first pressure range, the first measuring capacitors generate the first sensor signal, and the second measuring capacitors are used as reference capacitors, and
- at a pressure applied to the membranes in the second pressure range, the second measuring capacitors generate the second sensor signal, and the first measuring capacitors are short-circuited.

12. A micromechanical method for producing a capacitive pressure sensor element on a carrier and/or in a frame, the method comprising the following steps:
- producing a membrane;
- producing a first measuring capacitor configured to generate a first sensor signal, the first measuring capacitor being connected to the membrane, and producing, at the first measuring capacitor, a first electrode rigidly connected to the carrier or the frame and a second electrode movably connected to the membrane; and producing a second measuring capacitor configured to generate a second sensor signal, and producing, at the second measuring capacitor, a third electrode rigidly connected to the carrier or the frame and a fourth movable electrode;

wherein the first sensor signal is generated in accordance with a pressure of a first pressure range applied to the membrane, wherein the second measuring capacitor is operated as a reference capacitor in the first pressure range, and the second sensor signal is generated in accordance with a pressure of a second pressure range applied to the membrane.

13. The micromechanical method according to claim 12, wherein at least one plunger directed toward the second measuring capacitor is produced to a side of the first measuring capacitor, which plunger presses on the second measuring capacitor in the second pressure range upon application of a pressure to the membrane, wherein the plunger has no mechanical contact with the second measuring capacitor in the first pressure range and presses on the fourth electrode in the second pressure range in such a way that a distance between the third and fourth electrodes is reduced.

14. A method for generating a pressure sensor signal using a pressure sensor element, the pressure sensor element including a pressure-sensitive membrane;

a first measuring capacitor connected to the membrane and configured to generate a first sensor signal, wherein the first measuring capacitor has a first electrode and a second electrode; and a second measuring capacitor configured to generate a second sensor signal, wherein the second measuring capacitor has a third electrode and a fourth electrode, wherein:

the first measuring capacitor is configured to generate the first sensor signal in accordance with a pressure of a first pressure range applied to the membrane, and wherein the second measuring capacitor is operated as a reference capacitor in the first pressure range, and the second measuring capactitor is configured to generated the second sensor signal in accordance with a pressure of a second pressure range applied to the membrane;

wherein the method comprises the following steps:

detecting the first sensor signal of the first measuring capacitor;

detecting the second sensor signal of the second measuring capacitor; and generating the pressure sensor signal in two different operating modes, in accordance with a course of the first sensor signal, the pressure sensor signal being generated in a first operating mode in accordance with the first sensor signal, and in a second operating mode in accordance with the second sensor signal.

15. The method according to claim 14, wherein the first operating mode is assigned to the first pressure range and the second operating mode is assigned to the second pressure range adjoins the first pressure range.

16. The method according to claim 14, wherein a transition from the first to the second operating mode is recognized in accordance with a recognized short circuit of the first measuring capacitor, or a rate of change of the first sensor signal below a threshold value.

17. The method according to claim 14, wherein switching between the first and second operating modes of the pressure sensor takes place at predeterminable time intervals, and in the first pressure sensor signal or second pressure sensor signal then detected is evaluated with regard to monitoring a function of the pressure sensor and/or checking a plausibility of pressure measurements.

* * * * *